3,004,013
METHOD FOR PRODUCING FINELY DIVIDED POLYVINYL CHLORIDE

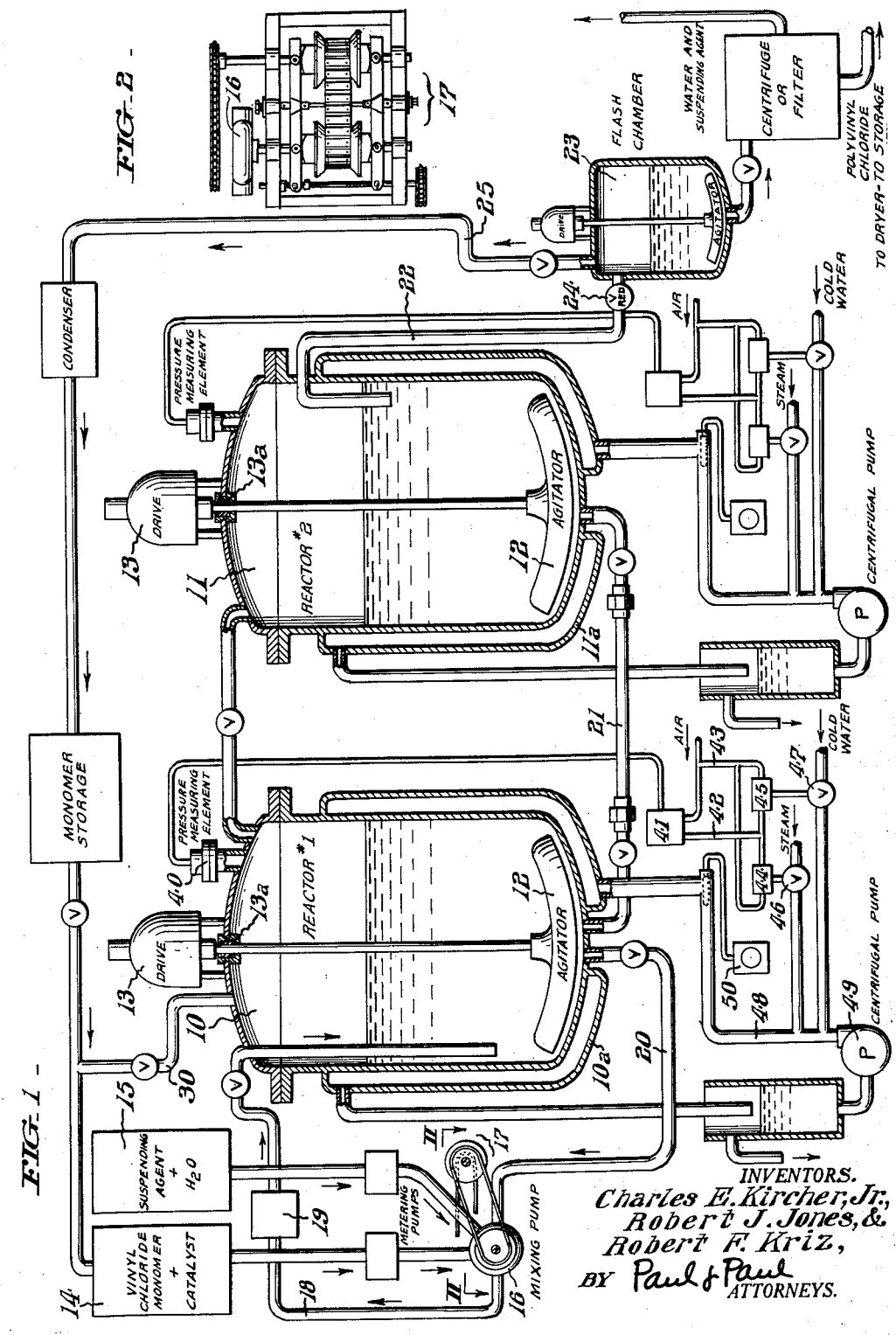
Oct. 10, 1961  C. E. KIRCHER, JR., ET AL  3,004,013
METHOD FOR PRODUCING FINELY DIVIDED POLYVINYL CHLORIDE
Filed April 28, 1954
INVENTORS.
Charles E. Kircher, Jr.,
Robert J. Jones, &
Robert F. Kriz,
BY Paul & Paul
ATTORNEYS.

Charles E. Kircher, Jr., Robert J. Jones, and Robert F. Kirz, Detroit, Mich., assignors to Detrex Corporation, Detroit, Mich., a corporation of Michigan
Filed Apr. 28, 1954, Ser. No. 426,135
6 Claims. (Cl. 260—92.8)

This invention relates to the suspension polymerization of vinyl chloride, to a method of and apparatus for polymerizing vinyl chloride, and to the polyvinyl chloride produced. More specifically, the invention relates to a method of making a finely divided polyvinyl chloride powder comprising a plurality of substantially spherical particles of uniform size which are characterized by their freedom from agglomeration.

While continuous polymerization processes have been proposed for the production of polyvinyl chloride, commercial production is almost exclusively carried out in batch reactors. It is an object of this invention to provide a commercially practical continuous process for producing polyvinyl chloride by suspension polymerization.

In the process of polymerizing vinyl chloride, the charge must be initially heated to bring it to the reaction temperature and then cooled to remove heat once the polymerization reaction has started. Accordingly, it has been considered necessary to jacket the reactor, or otherwise to provide means for selectively adding and withdrawing heat. However, any accumulation of polyvinyl chloride on the inside surface of the reactor interferes with heat transfer and makes control of the process more difficult. It is another object of this invention to overcome this difficulty.

In order to disperse vinyl chloride in the reaction medium, to maintain uniform conditions in the reactor during polymerization, and to promote better heat transfer, conventional batch reactors are usually provided with internal agitation. But vigorous agitation tends to cause the polymer to deposit on the internal walls of the reactor. Baffles are also usually provided in the reactors to assist the mixing operation, and the polymer also tends to deposit on the baffles, which complicates the cleaning problem. It is accordingly another object of this invention to provide an apparatus and method whereby the deposition of polyvinyl chloride on reaction equipment is minimized.

Agitation often initiates and aggravates a condition of foaming during vinyl chloride polymerization. Foaming is objectionable as it can cause failure of the agitator shaft seal if the foam carries resin particles into the seal. It can also result in the entrained resin particles becoming agglomerated and otherwise adversely changed. Where foaming tends to occur, the more violent the internal mixing, the more serious is the problem of foaming. It is accordingly a still further object of this invention to provide a method and apparatus for producing polyvinyl chloride from the monomer wherein the foaming problem is minimized.

Since vinyl chloride polymerization is normally carried out under pressure, it is essential to maintain a vapor tight seal on the rotating agitator shaft which extends into the reactor. This represents a mechanical problem which tends to become progressively more difficult with increased speeds of agitator shaft rotation. It is accordingly another object of this invention to provide a method and apparatus for polymerizing vinyl chloride utilizing a reactor wherein only moderate agitation is required which may be accomplished at a relatively low speed of shaft rotation.

In accordance with conventional processes, the polymerization of vinyl chloride monomer to form resins is carried out in the presence of water. Various surface active agents are added to the water to stabilize the dispersed phase during the polymerization reaction. A differentiation is made between the so-called emulsion polymerization and suspension polymerization methods. Different types of surface active agents are used to produce these two different kinds of polymerization systems. Also, in emulsion polymerization the catalyst is usually a water soluble peroxide added to the water phase while in suspension polymerization it is usually an organic peroxide soluble in the vinyl chloride monomer. The product from emulsion polymerization is usually a "latex" containing very small particles of resin which must be coagulated or agglomerated in order to separate them from the water phase. In suspension polymerization the resin is present in the form of small to large grains, granules or pearls which either settle on standing or can easily be removed by filtration or centrifuging. Suspension polymerization is to be regarded as being bulk polymerization carried out in each small dispersed drop of monomer. For the most part, in conventional processes, particle size in suspension polymerization has been determined by the type and amount of surface active agent or agents used. It is an object of this invention to provide a better method of controlling the particle size of the polyvinyl chloride resin product in a process of suspension polymerization.

The mixing action in large batch reactors is usually limited to that which can be obtained by the standard types of relatively low speed internal agitators commercially available. As pointed out above, suspension polymerization of vinyl chloride is carried out commercially on a large scale. Products of varying particle size distribution are obtained. For many important industrial applications it is highly desirable to be able to produce extremely fine polyvinyl chloride resin particles by a suspension polymerization process. It is accordingly an important object of this invention to provide such a process and to provide an apparatus for carrying it into effect. Still another object is to produce finely divided polyvinyl chloride which is composed of separate particles which do not tend to agglomerate. Other objects and advantages of this invention appear in further retail hereinafter.

It has now been discovered that, in the suspension polymerization of vinyl chloride monomer, the ultimate particle size of the polyvinyl chloride resin product can be controlled and determined by the type and degree of agitation used to disperse the vinyl chloride in the water phase. We have further discovered that this conditioning of the system for particle size can be accomplished during the first few minutes of the reaction period. The initial conditioning of the reaction mixture, in accordance with this invention, can be attained by vibrating, agitating, or pumping.

We have found that by connecting an externally positioned pump to the reaction kettle by means of piping, tubing or the like, thereby forming an external circuit, we can effectively control the size of the dispersed monomer droplets by varying the speed of the pump when circulating the charge through the external circuit. This conditioning of the reaction charge, which pre-determines the ultimate particle size of the resin, can be accomplished during the first hour of the cycle, for example, and before the polymerization reaction is well started. The pump can then be stopped, if desired, and essentially the balance of the polymerization cycle of 10 to 24 hours, for example, may be successfully completed using only mild internal agitation in the reaction kettle. A major difference in resin particle size results from the relatively short controlled pumping period.

In accordance with this invention the control of resin particle size is relatively quickly achieved, and thereafter only sufficient agitation need be provided in the reactor to keep the charge stirred and substantially uniform in composition. Shaft sealing problems do not present any difficulty since relatively low agitator shaft speeds may be used. Moreover, the size of the reactor itself is readily variable without introducing any problem so far as the desired resin particle size is concerned, since the external pump uniformly conditions the entire charge, and this pre-conditioning action remains substantially constant independently of variations of the reactor size. Moreover, the tendency of the polyvinyl chloride resin to deposit inside the reactor is reduced to a minimum, since a mild agitation is used inside the reactor, as contrasted to a violent internal agitation which causes much more deposition. It is entirely unnecessary to use internal baffles even in large reactors to assist the agitation.

Of the drawings:

FIG. 1 discloses, in vertical section, a typical arrangement of apparatus which is specifically adapted to the practice of this invention; and FIG. 2 represents a schematic plan view of a variable speed drive mechanism, taken as indicated by the lines and arrows II—II which appear in FIG. 1.

Turning now to the specific embodiment of the invention selected for illustration in the drawings, the number 10 designates a primary reactor wherein part of the polymerization reaction takes place, and the number 11 designates a secondary reactor wherein the reaction is continued and completed. Each reactor 10, 11 is provided with an external jacket 10a, 11a. Each reactor has an internal agitator 12 which rotates at a relatively low speed, being driven by an external motor 13 through a shaft which is sealed as indicated at 13a, where it enters the reactor.

The number 14 designates a storage tank for the vinyl chloride monomer and suitable catalyst. The number 15 designates a container for a water solution of a surface active suspending agent comprising polyvinyl alcohol or gelatin. As shown in the drawings, a mixing pump 16 of the rotary type is connected to receive vinyl chloride monomer plus catalyst on the one hand, and the suspending agent in water on the other hand, and to mix these two liquids vigorously within the pump. The pump impeller breaks down the respective feeds and mixes them thoroughly. It is the action of the pump impeller which so conditions the mixture that the particle size of the polyvinyl chloride is determined. Means are provided for varying the speed of the pump, such as the Reeves friction drive 17 (see also FIG. 2) which is a well known mechanical apparatus and is not further described herein.

The mixture from the pump passes through a feed pipe 18, which is preferably provided with a heat exchanger 19, and enters the reactor 10. The agitator 12 in reactor 10 is driven slowly for the purpose of preventing the solid particles from settling, and the reaction mixture is re-circulated through the pipe 20. The number 21 designates a transfer pipe wherein the reaction mixture is transferred from reactor 10 to reactor 11. The product is drawn out of reactor 11 through a pipe 22 which feeds through a reducing valve 24 into a flash chamber 23. The unreacted vinyl chloride monomer is flashed into vapor and is returned to the monomer storage container through the vapor return line 25, while the polyvinyl chloride finely divided particles are collected at the bottom of flash chamber 23; they are then centrifuged or filtered and dried and stored.

In accordance with one specific embodiment of this invention, the uniform, finely divided, physically distinct spherical particles of polyvinyl chloride are produced as follows: The charge of water containing polyvinyl alcohol in solution is placed in the polymerization kettle 10. Heat is applied to the jacket 10a to bring the solution to the desired reaction temperature (usually 50° C.) The kettle is then made tight and evacuated to remove non-condensable gases which, if present during the polymerization cycle, tend to cause foaming. The circulating pump 16 is turned on which starts a continuous flow of water-polyvinyl alcohol solution through the external circuit which includes the lines 18 and 20. The vinyl chloride monomer charge, containing the required amount of catalyst in solution, is positioned above the kettle in the tank 14, which is preferably a pressure tank. While the polyvinyl alcohol solution is circulating, a vapor equalizing line 30 between the vinyl chloride monomer tank 14 and the top of the kettle 10 is opened and then a metering pump is started which causes the liquid vinyl chloride monomer to flow at a controlled rate from the tank 14 into the suction side of the circulating pump 16. The vinyl chloride monomer is completely dispersed in the water due to the turbulence in the pump, and the small monomer droplets are instantly stabilized by the polyvinyl alcohol which forms a protective film on them. The size of the dispersed vinyl chloride monomer droplets can be controlled by regulating the speed of rotation of the pump. Degrees of turbulence, and therefore shearing forces on the fluid in the pump, vary with the pump speed. The entire charge of vinyl chloride is gradually added in the manner just described, and the resulting charge is very uniform with regard to chemical and physical properties.

In the apparatus shown in the drawings, means are provided for regulating the flow of heating or cooling agents to the reactor jackets. A pressure measuring element 40 communicates with the top of each reactor and leads to a pressure-responsive automatic controller 41. Controller 41 controls the air in air line 42 which in turn operates the pneumatically actuated valves 44 and 45 which respectively control a steam valve 46 and a cold water valve 47. The valves 46, 47 selectively supply either cold water or steam to the pipe 48, which carries the fluid to the jacket together with the fluid recirculated by a pump 49. A temperature recorder 50 gives a permanent record of circulating water temperature. It will be appreciated that the heating and cooling system may similarly be connected to the heat exchanger 19, and similarly controlled. In this manner the heating and cooling of each reactor is selectively accomplished in response to the internal pressure of the reactor. This provides more effective control than conventional methods wherein the temperature of the reaction mixture is used as a control. Pressure measurement can be used since the vapor pressure of vinyl chloride monomer is proportional to the existing temperature of the reaction mass. The conventional temperature measuring devices immersed in the reaction mixture are rapidly coated with polymer which is an insulator and causes a serious time lag, which is not experienced using the pressure responsive apparatus of this invention.

While the vinyl chloride monomer is being added through the circulating pump, the internal agitator of the kettle is rotated at the relatively slow speed of 100–200 r.p.m., for example. Having made and stabilized a fine dispersion of the monomer in the rotary pump circulating system, it is sufficient to maintain mild agitation in the kettle 10 by means of the internal agitator 12 throughout the balance of the polymerization cycle (about 10–20 hours) in order to obtain a polyvinyl chloride product consisting of uniform, fine, spherical particles.

In accordance with this invention it is possible to carry out the suspension polymerization of vinyl chloride using an externally positioned pump or the equivalent, not only to pre-condition the monomer dispersion and control the resin particle size, but also to provide sufficient internal mixing so that if the external pump is allowed to operate throughout the polymerization cycle only the simplest type of low speed internal agitator is required. Although it would normally be expected that the presence of polymerized resin would foul the pump, we have found that this does not occur.

The unique construction and method of operation described in the foregoing paragraph makes possible related apparatus and process improvements of substantial value. For example, heat transfer units such as the heat exchanger 19 can be installed in the external circulation system to take care of heating the charge initially as well as cooling it when heat is liberated by the polymerization reaction. These units may be of any required size. This construction and arrangement represents a degree of flexibility in design which cannot be realized with jacketed reactors wherein the heat transfer surface is fixed by the size of the vessel. In large reactors the rate of resin production is limited by the rate of heat removal which in turn is limited by the heat transfer surface of the reaction kettle. This limitation is not a problem in accordance with this invention since almost any desired heat transfer area can be provided in the external flow circuit, and the polyvinyl chloride resin is surprisingly slow to deposit on the heat exchanging surfaces.

It is also of substantial importance that, in accordance with this invention, control of resin particle size is easily and positively effected by regulating the speed of the pump during the conditioning period wherein the monomer is being dispersed in the water phase. While we have discussed at some length the use of a rotary pump to supply the energy to produce a controlled monomer dispersion we do not wish to limit ourselves to the use of this device since other sources of energy such as sonic and ultrasonic transducers, other types of pumps, or other devices capable of creating the desired dispersion of monomer in water might be used.

The invention is further illustrated by the following examples.

Example 1

Vinyl chloride containing dissolved catalyst (lauroyl peroxide) was placed in a reactor like the primary reactor shown in the drawings, containing a water solution of suspending agent (polyvinyl alcohol, 1.5% by weight based on the weight of vinyl chloride monomer) which had been heated to 50° C. and evacuated. The agitator was then started at 300 revolutions per minute. At the same time external circulation of the charge was created by starting the external pump. The external pump was operated at 700 r.p.m. for 2½ hours and then stopped. After one hour the speed of the internal agitator was increased to 400 r.p.m., and agitation was continued at that speed for 15½ hours. The product was then drawn off and, after drying, it was subjected to a screen analysis. It was found that 99% by weight passed a standard 80-mesh screen, 98% by weight passed a standard 100 mesh screen, and 52% by weight passed a standard 200 mesh screen. The polyvinyl chloride product consisted of a plurality of finely divided physically distinct substantially spherical particles which had substantially no tendency to agglomerate.

Example 2

The procedure of Example 1 was repeated with the exception that the internal agitator was started at 400 r.p.m., and the external circulating pump was operated continuously at 1280 r.p.m. throughout the run, which was complete in 11 hours. The resulting polyvinyl chloride product consisted of uniform spherical particles 100% of which passed a standard 100 mesh screen and 85% by weight of which passed a standard 200 mesh screen.

Example 3

The procedure of Example 2 was repeated. However the internal agitation was at 200 r.p.m. for four hours and was then increased to 360 r.p.m. for six hours. The external circulating pump was operated for four hours at 1667 r.p.m. and then shut down. 100% of the product passed a standard 100 mesh screen, 86% passed a standard 200 mesh screen. The product consisted of uniform, spherical polyvinyl chloride resin particles.

Example 4

The procedure of Example 3 was repeated, however the internal agitation was accomplished by rotating the agitator at 200 r.p.m. throughout the run. The operation of the external pump at 1667 r.p.m. was continued throughout the run, which was completed in ten hours. 100% of the product passed at standard 100 mesh screen, 96% by weight passed a standard 200 mesh screen, and 34% by weight passed a standard 325 mesh screen. The product consisted of uniform physically distinct spherical particles.

Example 5

A water solution of polyvinyl alcohol was placed in a reactor, heated to reaction temperature, and the internal agitator was started at 200 r.p.m. The external circulation pump was started at 1667 r.p.m. and then vinyl chloride monomer containing catalyst (lauroyl peroxide) in solution was fed to the suction side of the circulating pump. In this manner, phase mixing was effected in the pump. The pump was operated for 1.5 hours whereupon it was shut down. The internal agitator at that time was adjusted to operate at 350 r.p.m. After eight hours the reaction was complete. The product showed 100% through 80 mesh, 99% by weight through 100 mesh and 81% through 200 mesh. It consisted of uniform finely divided spherical resin particles.

Example 6

The procedure of Example 5 was repeated, substituting gelatin for polyvinyl alcohol, the quantity being 0.75% by weight gelatin based on the weight of the vinyl chloride monomer charge. The circulating pump was operated at 1667 r.p.m. for 3½ hours before being stopped and the internal agitator was operated at a constant speed of 200 r.p.m. for the entire polymerization period, which was ten hours. The polyvinyl chloride product was subjected to a screen analysis with the following results: 100% through 100 mesh, 39% by weight through 200 mesh. The product consisted of uniform finely divided spherical particles.

Example 7

Vinyl chloride containing dissolved catalyst (lauroyl peroxide) was placed in a 20-gallon reactor containing a water solution of polyvinyl alcohol. The polyvinyl alcohol was present in an amount of 1.14% by weight based on the weight of vinyl chloride monomer charge. The internal agitator was started at 100–150 r.p.m. and agitation was continued at this rate until the polymerization was complete. No external pumping was employed. The product consisted of coarse particles of polyvinyl chloride none of which passed a standard 40-mesh screen.

Example 8

Example 7 was repeated, using an internal agitator speed of 450 r.p.m. with no external pumping. The product was somewhat finer but only 83% by weight passed a standard 60 mesh screen, 48% by weight passed a standard 100 mesh screen, and 16% by weight passed a standard 200 mesh screen.

Although we have described various specific means for carrying out the invention, it will be appreciated that other modifications may readily be made. For example, more than one secondary reactor may be utilized in combination with a primary reactor, and various mixing means may be utilized in place of or in combination with the rotary pump 16. Other changes, including reversals of parts, the use of equivalents, and the use of certain features of the invention independently of the use of other features, are within the spirit of this invention as defined in the appended claims.

Having thus described our invention, we claim:

1. In a process for the manufacture of polyvinyl chloride by the suspension polymerization of vinyl chloride, the steps which comprise mixing vinyl chloride monomer and lauroyl peroxide with polyvinyl alcohol, said polyvinyl alcohol being dissolved in water in which said monomer is insoluble, by subjecting the resultant mixture to mechanical forces so as to permanently disperse the vinyl chloride monomer and lauroyl peroxide in said aqueous polyvinyl alcohol in the form of a plurality of finely divided, physically distinct, uniform spheres, substantially 100% of said spheres having a particle size such that they would pass a standard 100 mesh screen, and at least 50% by weight of said spheres having a particle size such that they would pass a standard 200 mesh screen, then effecting polymerization of the resultant dispersion while agitating the dispersion whereby the particle size of the dispersed spheres is substantially maintained, and recovering polyvinyl chloride in the form of uniform spheres having a particle size substantially that of the initial dispersed vinyl chloride and lauroyl peroxide.

2. In a process for the manufacture of polyvinyl chloride by the suspension polymerization of vinyl chloride, the steps which comprise mixing vinyl chloride monomer and lauroyl peroxide with polyvinyl alcohol, said polyvinyl alcohol being dissolved in water in which said monomer is insoluble, by subjecting the resultant mixture to mechanical forces so as to permanently disperse the vinyl chloride monomer and lauroyl peroxide in said aqueous polyvinyl alcohol in the form of a plurality of finely divided, physically distinct, uniform spheres, substantially 100% of said spheres having a particle size such that they would pass a standard 100 mesh screen, and at least 50% by weight of said particles having a particle size such that they would pass a standard 200 mesh screen, then effecting polymerization of the resultant dispersion in a primary reactor, agitating the dispersion in the primary reactor, continuously pumping the dispersion out of the primary reactor and returning the dispersion into the primary reactor, continuously transferring part of the dispersion from the primary reactor to a secondary reactor, agitating the dispersion in the secondary reactor, further continuing the polymerization in the secondary reactor while substantially maintaining the particle size of the dispersed spheres, and continuously recovering polyvinyl chloride product from the secondary reactor in the form of uniform spheres having a particle size substantially that of the initial dispersed vinyl chloride and lauroyl peroxide.

3. In a process for the manufacture of polyvinyl chloride by the suspension polymerization of vinyl chloride, the steps which comprise mixing vinyl chloride monomer and lauroyl peroxide with polyvinyl alcohol, said polyvinyl alcohol being dissolved in water in which said monomer is insoluble, by subjecting the resultant mixture to mechanical forces so as to permanently disperse the vinyl chloride monomer and lauroyl peroxide in said aqueous polyvinyl alcohol in the form of a plurality of finely divided, physically distinct, uniform spheres, substantially 100% of said spheres having a particle size such that they would pass a standard 100 mesh screen, and at least 50% by weight of said particles having a particle size such that they would pass a standard 200 mesh screen, then effecting polymerization of the resultant dispersion in a primary reactor, agitating the dispersion in the primary reactor, continuously pumping the dispersion out of the primary reactor and returning the dispersion into the primary reactor, continuously transferring part of the dispersion from the primary reactor to a secondary reactor, agitating the dispersion in the secondary reactor, further continuing the polymerization in the secondary reactor while substantially maintaining the particle size of the dispersed spheres, and continuously recovering polyvinyl chloride product from the secondary reactor in the form of uniform spheres having a particle size substantially that of the initial dispersed vinyl chloride and lauroyl peroxide, whereby the dispersion is admitted to the primary reactor in response to the liquid level or pressure in the secondary reactor, and the vinyl chloride monomer, lauroyl peroxide and polyvinyl alcohol are automatically fed into the primary reactor at a rate corresponding to the rate of recovery of polyvinyl chloride product from the secondary reactor.

4. The process of claim 1 wherein said polyvinyl alcohol is added in an amount of from about 1.14 to about 1.5 percent by weight of the vinyl chloride monomer.

5. The process of claim 2 wherein said polyvinyl alcohol is added in amount of from about 1.14 to about 1.5 percent by weight of the vinyl chloride monomer.

6. The process of claim 3 wherein said polyvinyl alcohol is added in an amount of from about 1.14 to about 1.5 percent by weight of the vinyl chloride monomer.

References Cited in the file of this patent

UNITED STATES PATENTS

| | | |
|---|---|---|
| 2,194,354 | Crawford et al. | Mar. 19, 1940 |
| 2,227,163 | Starck et al. | Dec. 31, 1940 |
| 2,332,527 | Pyzel | Oct. 26, 1943 |
| 2,375,730 | Caldwell et al. | May 8, 1945 |
| 2,388,600 | Collins | Nov. 6, 1945 |
| 2,475,016 | De Nie | July 5, 1949 |
| 2,674,585 | Condo et al. | Apr. 6, 1954 |
| 2,813,850 | Van Dijk et al. | Nov. 19, 1957 |
| 2,890,211 | Lintala | June 9, 1959 |

FOREIGN PATENTS

| | | |
|---|---|---|
| 639,729 | Great Britain | July 5, 1950 |

UNITED STATES PATENT OFFICE
CERTIFICATION OF CORRECTION

Patent No. 3,004,013                           October 10, 1961

Charles E. Kircher, Jr., et al.

It is hereby certified that error appears in the above numbered patent requiring correction and that the said Letters Patent should read as corrected below.

In the grant, lines 1,2 and 3, for "Charles E. Kircher, Jr., Robert J. Jones, and Robert F. Kirz, of Detroit, Michigan, assignors to Detrex Corporation, of Detroit, Michigan, a corporation of Michigan," read -- Charles E. Kircher, Jr., Robert J. Jones, and Robert F. Kriz, of Detroit, Michigan, assignors to Detrex Chemical Industries, Inc., a corporation of Michigan, --; line 12, for "Detrex Corporation, its successors" read -- Detrex Chemical Industries, Inc., its successors --; in the heading to the printed specification, lines 4,5 and 6, for "Charles E. Kircher, Jr., Robert J. Jones, and Robert F. Kirz, Detroit, Mich., assignors to Detrex Corporation, Detroit, Mich., a corporation of Michigan" read -- Charles E. Kircher, Jr., Robert J. Jones, and Robert F. Kriz, Detroit, Mich., assignors to Detrex Chemical Industries, Inc., a corporation of Michigan --; column 8, list of references cited, under UNITED STATES PATENTS, add the following:

2,564,291    Wolf ---------- Aug. 14, 1951

Signed and sealed this 10th day of April 1962.

(SEAL)
Attest:

ERNEST W. SWIDER                         DAVID L. LADD
Attesting Officer                       Commissioner of Patents